(12) United States Patent
Renosky

(10) Patent No.: US 10,609,911 B1
(45) Date of Patent: Apr. 7, 2020

(54) FISH ATTRACTION DEVICE

(71) Applicant: Joseph Renosky, Indiana, PA (US)

(72) Inventor: Joseph Renosky, Indiana, PA (US)

( * ) Notice: Subject to any disclaimer, the term of this patent is extended or adjusted under 35 U.S.C. 154(b) by 0 days.

(21) Appl. No.: 15/647,883

(22) Filed: Jul. 12, 2017

Related U.S. Application Data

(60) Provisional application No. 62/361,194, filed on Jul. 12, 2016.

(51) Int. Cl.
*A01K 85/10* (2006.01)
*A01K 85/00* (2006.01)
*A01K 97/00* (2006.01)

(52) U.S. Cl.
CPC .............. *A01K 85/10* (2013.01); *A01K 85/00* (2013.01); *A01K 97/00* (2013.01)

(58) Field of Classification Search
CPC ........ A01K 85/10; A01K 85/00; A01K 85/14; A01K 83/00; A01K 85/02; A01K 85/18; A01K 91/04; A01K 85/08; A01K 91/03
USPC ............. 43/42.19, 42.11, 42.49, 42.28, 17.6, 43/42.05, 42.1, 42.12, 42.16, 42.43, 43/42.47, 42.5, 43.1, 43.15, 44.83, 44.87
See application file for complete search history.

(56) References Cited

U.S. PATENT DOCUMENTS

| | | | | |
|---|---|---|---|---|
| 2,609,633 A | * | 9/1952 | Cracker | A01K 85/16 43/42.05 |
| 2,979,849 A | * | 4/1961 | Anderson, Jr. | A01K 85/16 43/42.02 |
| 7,621,068 B1 | * | 11/2009 | Renosky | A01K 85/01 43/42.03 |
| 8,656,633 B2 | * | 2/2014 | Renosky | A01K 85/00 43/42.22 |
| 2006/0242887 A1 | * | 11/2006 | Toman | A01K 85/10 43/42.19 |
| 2012/0073182 A1 | * | 3/2012 | Poss | A01K 85/00 43/42.13 |
| 2013/0180160 A1 | * | 7/2013 | Petherick | A01K 91/04 43/43.1 |
| 2015/0096220 A1 | * | 4/2015 | Buhler | A01K 85/00 43/42.11 |
| 2016/0205908 A1 | * | 7/2016 | Stanford | A01K 85/10 |
| 2017/0150706 A1 | * | 6/2017 | Jung | A01K 85/16 |

* cited by examiner

*Primary Examiner* — Peter M Poon
*Assistant Examiner* — Jeffrey R Larsen

(57) ABSTRACT

A fish attraction device that includes a jig body, a blade with a snap, a pair of crimping sleeves, a quick change snap swivel and a crinkle resistant leader wire. The jig body includes an attachment in its front portion for attaching the blade, and the rear portion of the jig body includes a first crimp sleeve that is attached to a first end of the leader wire. The leader wire extends from the rear portion of the jig body a sufficient length for attaching to a chase bait that can be appropriately attached on an opposite end of the leader wire using a second crimp sleeve and quick change snap swivel.

10 Claims, 5 Drawing Sheets

FISH ATTRACTION DEVICE

CROSS REFERENCES TO RELATED APPLICATIONS

U.S. Provisional Application for Patent No. 62/361,194, filed Jul. 12, 2016, with title "Fish Attraction Device" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not applicable.

BACKGROUND OF THE INVENTION

1. Field of the Invention

The present disclosure relates generally to a device for improving the chances of catching fish, and more particularly, a device that can enhance and be used with a variety of fishing baits in the fisherman's tackle box.

2. Background Information

Fish may be attracted by a fishing lure's features such as shape, color, or sounds produced by the lure. A lure which possesses desirable characteristics will attract fish. Unfortunately, many lures or bait in a fisherman's tackle box do not possess the desired characteristics and have proven unsuccessful to the fisherman in attracting and catching fish.

The present invention addresses the shortcomings of previous fishing lures and fish attractors. The present invention enhances those baits that have previously proven unsuccessful to the fisherman and, further enhances those fishing baits that the fisherman has previously experienced some success. There has not been available a fish attractor device with the advantages and features of the present invention.

SUMMARY OF THE INVENTION

A fish attraction device that generally includes a jig body, a blade with a snap, a pair of crimping sleeves, a quick change snap swivel and a crinkle resistant leader wire.

The jig body includes an attachment in its front portion for attaching the blade. The rear portion of the jig body includes an integral first crimp sleeve that is attached to the leader wire.

The leader wire extends from a rear portion of the jig body a sufficient length in order to fully expose a trailing chase bait that is appropriately attached on an opposite end of the leader wire using a second crimp sleeve and quick change snap swivel.

DESCRIPTION OF THE PREFERRED EMBODIMENT

Figure 1:
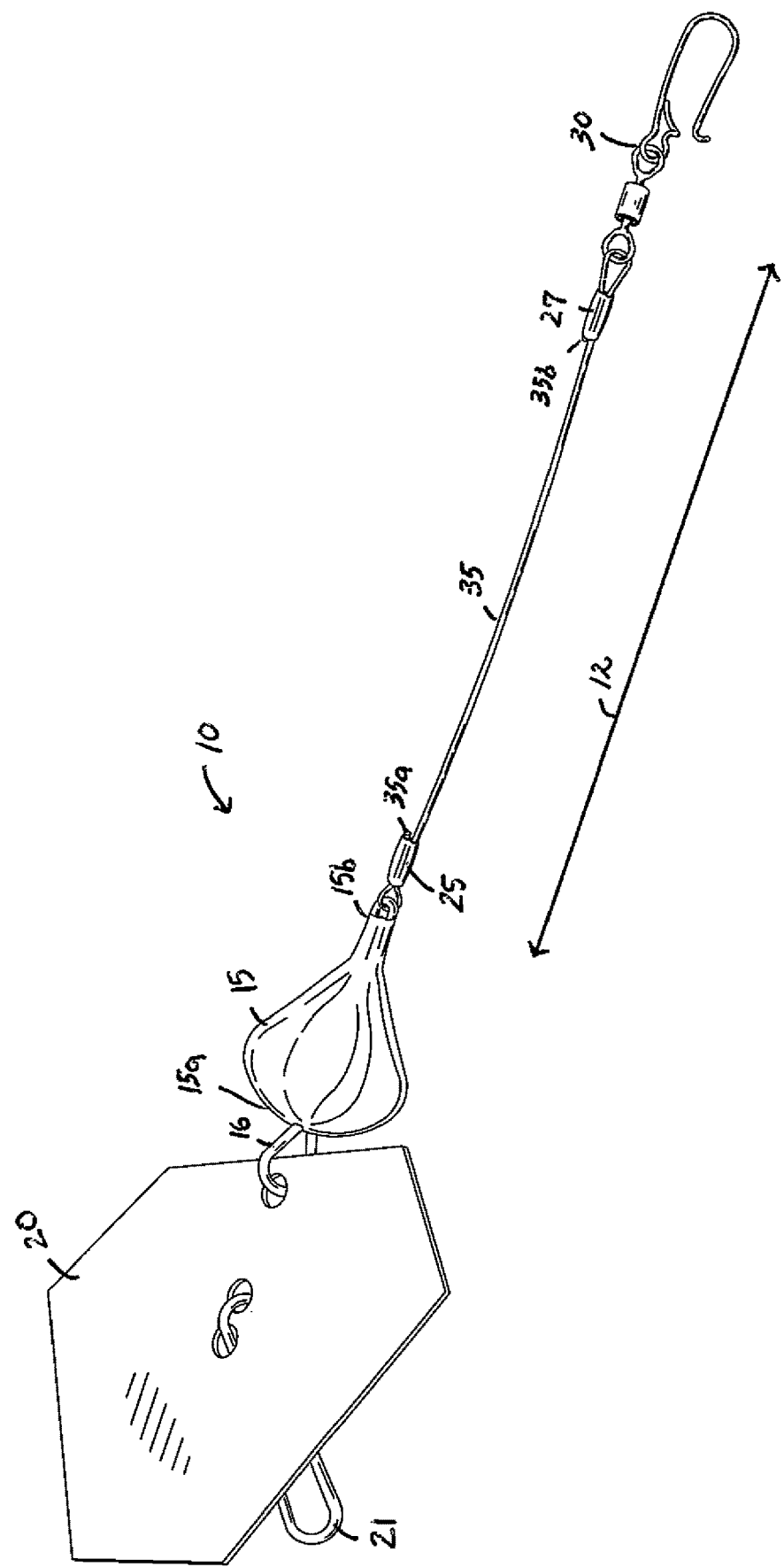
FIG. 1 is a perspective view of the present invention, a fish attraction device.
Figure 2:
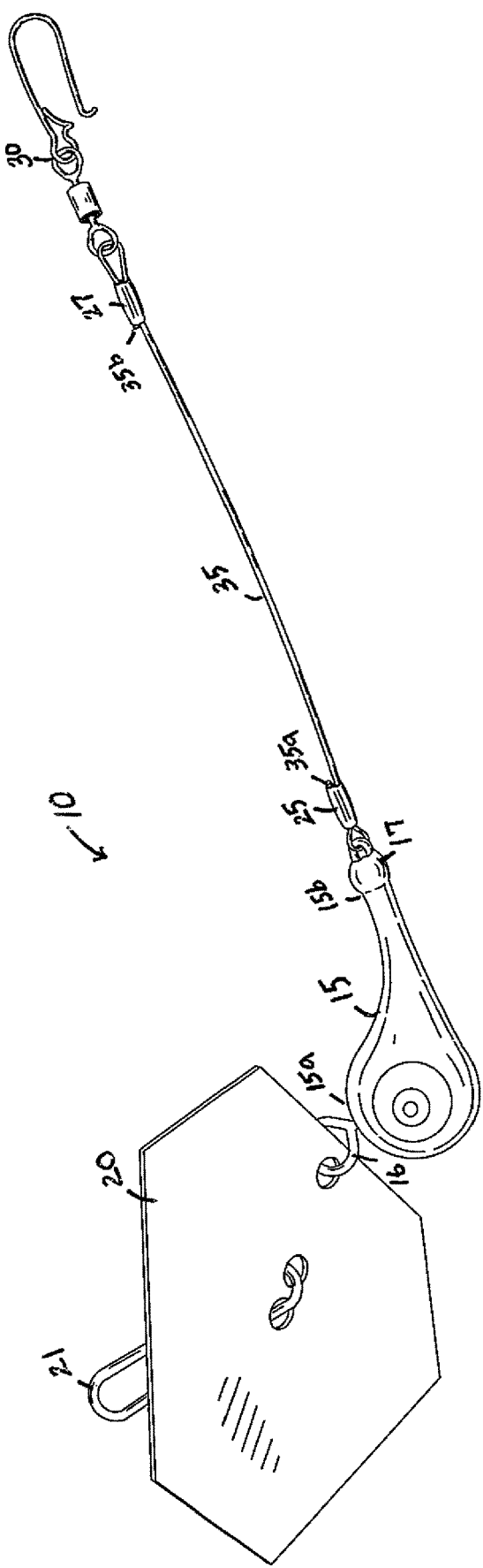
FIG. 2 is a side view of the device illustrated in FIG. 1.

The present invention is directed to a fishing device primarily used for attracting fish that can be used with a variety of fishing lure's already in the fisherman's tackle box. More particularly, the present invention discloses a fish attraction device that can enhance and improve the chances of catching fish using the fisherman's existing fishing lures. In the broadest context, the fish attraction device of the present invention consists of components configured and correlated with respect to each other so as to attain the desired objective.

Referring to the drawings, the present attraction device, designated as numeral 10, generally includes a jig body 15, a blade 20 with a snap 21, crimping sleeves 25, 27, a quick change snap swivel 30, and a crinkle resistant wire 35.

In a first embodiment (FIG. 1), the jig body 15 defines a fixed loop 16 that is fixed to or fixed within a front portion 15a of the jig body 15 for attaching the blade 20, and a collar 17 on the opposite, rear portion 15b of the jig body for attaching and replacing a skirt 40. The rear portion 15b of the jig body 15 may further define, or is adjacent to a first crimp sleeve 25 that is attached to the wire 35. Preferably, the first crimp sleeve 25 is integral to the rear portion 15b of the jig body 15 and the wire 35 extends from the rear portion 15b. More particularly, the jig body 15 defines a longitudinal axis 12 (FIG. 1), and the length of the first crimp sleeve 25 is parallel with the axis 12.

Figure 4:
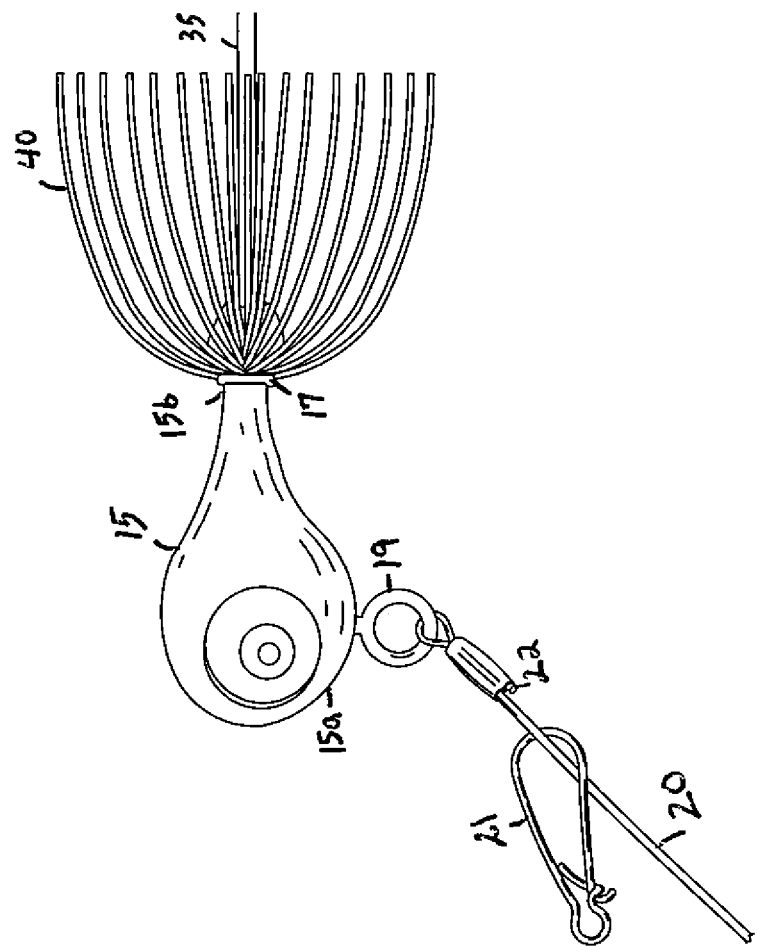
FIG. 4 is an enlarged view of the jig body having a pivotal loop for attaching the blade.

The blade 20 is appropriately attached to the loop 16 at the front portion 15a of the jig body 15 with for example, a loop wire 22 (see FIG. 4). The blade 20 further includes the snap 21 for attaching to the fisherman's fishing line (not shown).

Figure 3:
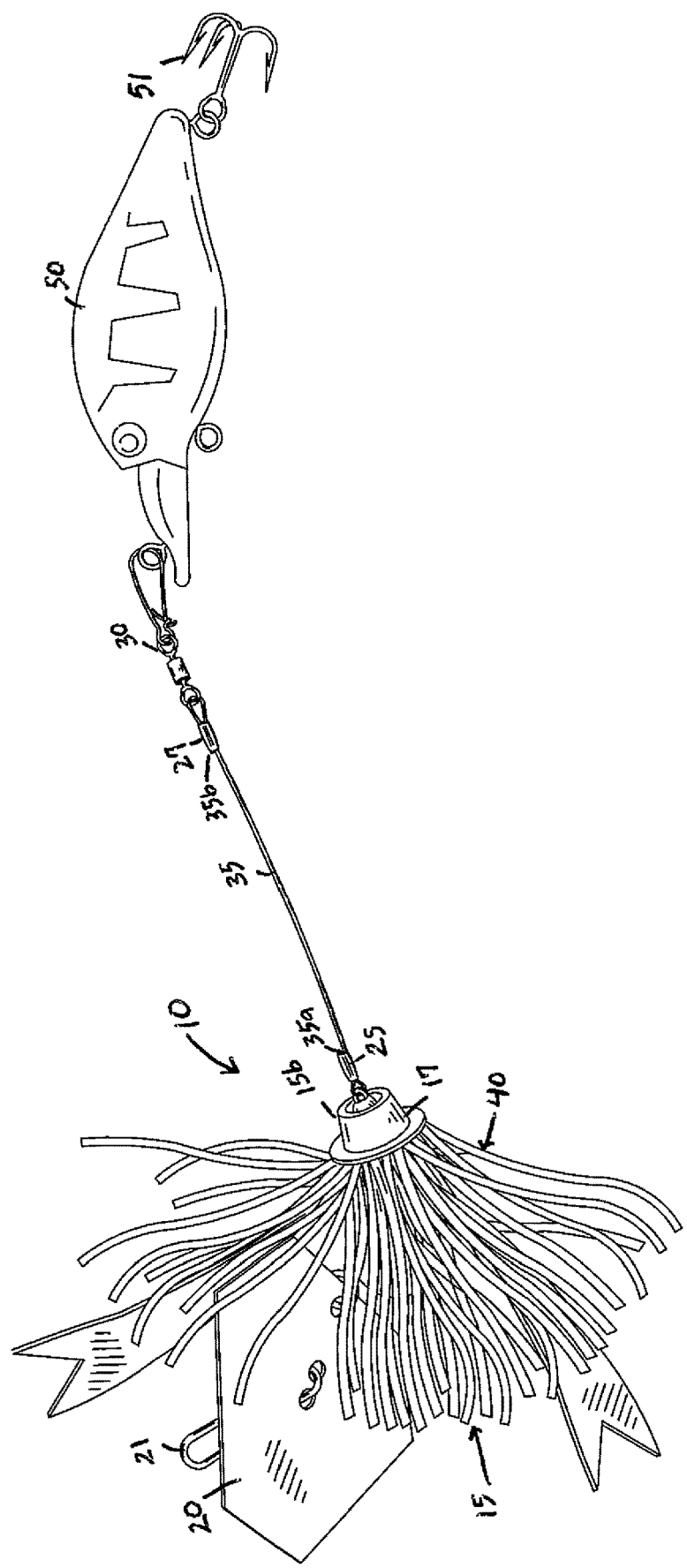
FIG. 3 is a perspective view of the present invention with a prior art chase bait.

The first crimp sleeve 25 is configured to crimp a first end 35a of the crinkle resistant wire 35. As will be understood, the wire 35 preferably extends past the silicon skirt 40 a sufficient length in order to fully expose the trailing prior art chase bait 50 (see FIG. 3) as will be further described. The inventor has found that the leader wire 35 extending approximately 1" to 2" from the rear portion 15b works best.

A quick change snap swivel 30 is appropriately attached on an opposite end 35b of the leader wire 35 using a second crimp sleeve 27. The inventor has found using the quick change snap swivel 30 keeps the prior art chase bait 50 swimming naturally.

In application, with the leader wire 35 crimped to the jig body 15 as disclosed, the jig 15 and blade 20 are pulled through the water causing oscillation and vibration of the fishing attractor 10. Such oscillation and vibration will send shock waves down the crinkle restraint leader wire 35, giving life to the fisherman's selection of bait 50 keeping the selected bait 50 running naturally. This vibration also gives life to the skirt 40 that can be attached to the skirt collar 17 of the jig body 15, which further attracts predator fish.

The leader wire 35 can be appropriately attached to jig body 15 in a number of ways. The first sleeve 25 can be crimped into the flexible wire 35 and molded into the rear portion 16b of the jig body 15. The quick change snap swivel 30 can be crimped to the other end 35b of the wire 35 for easily changing bait 50 and keeping it swimming naturally. The first crimp sleeve 25 may also be attached to a wire eyelet (not shown) and molded into the jig head 15 with again, a portion of the sleeve 25 extending from the rear portion 15*b* of the jig head 15. The first end 35*a* of the wire 35 can then be attached to the first crimp sleeve 25 and the quick change snap swivel 30 can be attached at the opposite end 35*b* with the second crimp sleeve 27 for quick changing the bait 50 and keeping the bait 50 swimming naturally.

Figure 5:
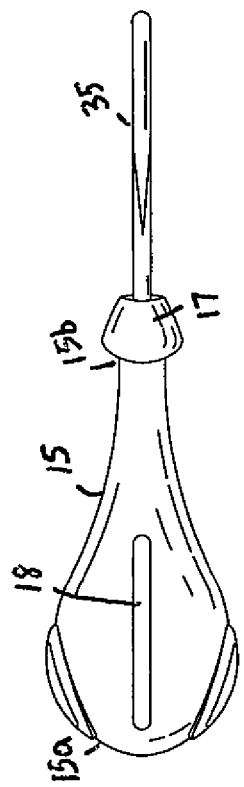
FIG. 5 is a side view of the jig body shown in FIG. 4, specifically illustrating the defined slot that receives the pivotal loop.

In a second embodiment the jig body 15 includes a slot 18 (see FIG. 5) defined in the front portion 15*a*. A pivotal loop or S-link 19 is pivotally disposed in the slot 18. The pivotal loop 19 is used in place of the fixed loop 16 disclosed in the first embodiment. The loop 19 for attaching the blade 20 to the jig body 15.

In application, with the leader wire 35 crimped to the jig body 15 as disclosed, the jig body 15 and blade 20 are pulled through the water causing oscillation and vibration of the fishing attractor 10. The oscillation and vibration of the blade pivoting on the loop 19 will send shock waves down the crinkle resistant leader wire 35, giving life to the fisherman's selection of bait 50 keeping the selected bait 50 running naturally. This vibration also gives life to the skirt 40 that can be attached to the skirt collar 17 of the jig body 15, which further attracts predator fish.

As illustrated and described, the present invention does not include a fishing hook. As should now be understood, the selected chase bait 50 which is not part of the present invention, can represent any fishing lure in the fisherman's tackle box, and as is known, includes a hook 51 for catching fish.

Although the above description contains many specificities, these should not be construed as limiting the scope of the invention but as merely providing illustrations of some of the presently preferred embodiments of this invention. As such, it is to be understood that the present invention is not limited to the embodiments described above, but encompasses any and all embodiments within the scope of the claims.

It would be obvious to those skilled in the art that modifications may be made to the embodiments described above without departing from the scope of the present invention. For example, the embodiments described above were added to a jig body having a fixed loop, and a jig body having S-link pivotally disposed in a slot. It should be understood that the attraction embodiments disclosed may for example, also be incorporated in a buzzbait form of a jig, a spinner bait or an in-line spinner. Thus the scope of the invention should be determined by the appended claims in the formal application and their legal equivalents, rather than by the examples given.

I claim:

1. A fish attraction device comprising:
    a jig body that defines a rear portion, said rear portion consisting of a wire fixed to said rear portion, said wire having an end attached to a snap swivel configured for releasably attaching a prior art chase bait such that said wire is disposed between said rear portion and said snap swivel,
    a collar for attaching a skirt,
    a loop fixed to a front portion of said jig body, a blade attached to said loop and adjacent said front portion, said blade further including a snap for attaching a fisherman's fishing line, and wherein said blade and said jig body and said wire are arranged end-to-end forming a straight line, and wherein said straight line is parallel with a longitudinal axis, and wherein said jig body does not include a hook, and as the jig body and the blade are pulled through water by the fishing line attached to the snap the jig body and the blade cause oscillation and vibration to the fish attraction device that sends shock waves down said wire to the chase bait.

2. The device of claim 1, wherein said wire extends approximately 1 to 2 inches from said rear portion.

3. The device of claim 1, wherein said wire is a crinkle resistant wire.

4. The device of claim 1, wherein said snap swivel is a quick change snap swivel.

5. The device of claim 1, wherein said front portion includes a slot and said loop is pivotally disposed in said slot, and wherein said blade is attached to said loop.

6. A fish attraction device configured for attaching to a prior art chase bait, said fish attraction device comprising:
    a jig body that includes a rear portion, said rear portion consisting of a wire fixed to said rear portion, said wire having an end attached to a connector,
    said connector for releasably attaching a prior art chase bait,
    a blade attached to a loop fixed to a front portion of said jig body,
    said blade in communication with said front portion and further including a snap for attaching a fisherman's fishing line,
    and wherein said blade and said jig body and said wire are arranged end-to-end forming a straight line, and wherein said straight line is parallel with a longitudinal axis, and wherein said fish attraction device does not have a hook, and as the jig body and the blade are pulled through water by the fishing line attached to the snap the jig body and the blade cause oscillation and vibration to the fish attraction device that sends shock waves down said wire to the chase bait.

7. The device of claim 6, wherein said connector is a quick change snap swivel.

8. The device of claim 6, wherein said front portion includes a slot that is generally parallel to said length.

9. The device of claim 8, wherein said loop is pivotally disposed in said slot.

10. The device of claim 6, further including a collar for releasably attaching a skirt.

* * * * *